July 20, 1965  J. G. BAKER  3,195,715

VIBRATORY CONVEYOR

Original Filed Jan. 31, 1961

United States Patent Office 3,195,715
Patented July 20, 1965

---

3,195,715
VIBRATORY CONVEYOR
Jacob G. Baker, P.O. Box 28248, Dallas 28, Tex.
Original application Jan. 31, 1961, Ser. No. 86,044, now Patent No. 3,123,203, dated Mar. 3, 1964. Divided and this application Dec. 26, 1963, Ser. No. 333,593
7 Claims. (Cl. 198—220)

The present invention relates to vibratory conveyors for providing conveyance to objects or materials by imparting a combination of vertical and horizontal components of movement to an active top surface of the conveyor in response to vibration of the top surface along the desired path.

This application is a division of my earlier application S.N. 86,044 filed January 31, 1961.

An object of the present invention is the provision of a novel vibratory conveyor of generally panel-like configuration which is of simple construction and reliable operation, and provides a very thin cross-sectional, thin panel construction.

Another object of the present invention is the provision of a novel vibratory conveyor construction which facilitates selection of a wide variety of thrust and directional characteristics.

Other objects, advantages and capabilities of the present invention will become apparent from the following detailed description, taken in conjunction with the accompanying drawing illustrating preferred embodiments of the invention.

Figure 1:
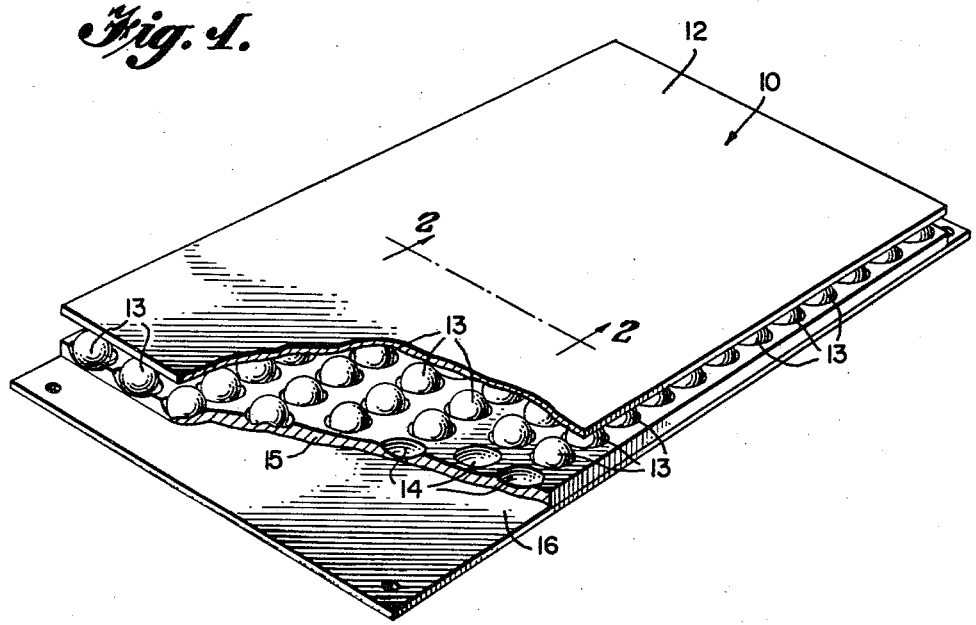
Figure 2:
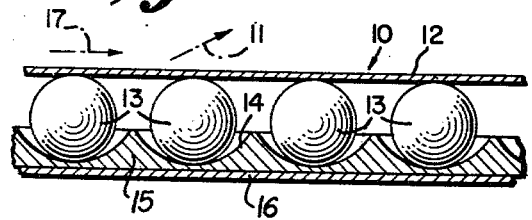

In the drawing:
FIGURE 1 is a perspective view, with parts broken away, of a vibratory conveyor unit constructed in accordance with the present invention;
FIGURE 2 is a vertical longitudinal section view taken along the line 2—2 of FIGURE 1; and
FIGURES 3, 4, 5, 6 and 7 are vertical longitudinal section views of other forms of vibratory conveyor units constructed in accordance with the present invention.

Referring to the drawing, a simple form of vibratory conveyor constructed in accordance with the present invention is illustrated in FIGURES 1 and 2, wherein a selectively directional vibratory conveyor, indicated generally by the reference character 10, uses spherical balls to produce a thrust component, indicated by the arrow 11, to toss or propel an object or material on the conveyor along a desired path. The conveyor 10 includes a flat rectangular active or top plate 12 which rides on the tops of a group of hard roller bodies, here shown as spherical balls 13. The balls 13 are seated in sockets 14 formed, for example, by molding, in a suitable body of material 15 forming part of or fixed to a base plate 16. The sockets 14 for the balls 13 have a larger radius than the balls 13, so that the balls 13, when they are rotated by application of a horizontal vibratory force on the active plate 12 along the desired path of travel, indicated by the arrow 17, ride part of the way up the sides of their associated sockets 14.

Since conveyors of this type rely upon an incremental area of the active surface or plate 12 of the conveyor achieving, during each cycle of operation, a vertical acceleration greater than the acceleration due to gravity, it will be apparent that as the balls 13 ride up on the spherically curved sides of the sockets 14 and a particle material to be conveyed is in contact with the active upper surface of the plate 12, the particle will have imparted to it an acceleration substantially the same as that imparted to the plate 12. When the direction of movement of the plate 12 is reversed and the balls 13 return down along the sides of the sockets 14, the plate 12 recedes downwardly at an acceleration greater than the acceleration due to gravity and the particle of material leaves the active surface and is tossed to another incremental area of the plate spaced along the desired direction of travel.

An important incident of this construction is the fact that the path or direction of travel of the material to be conveyed can be varied merely by changing the direction of the reciprocative vibratory motion imparted to the upper plate 12, since the spheric nature of the balls 13 and sockets 14 will produce the same action described above in any direction along which the vibratory force is applied.

Figure 3:
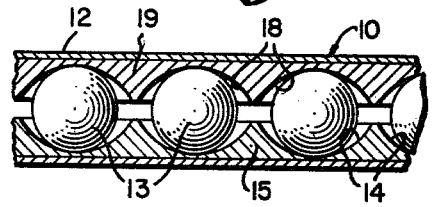

It will be apparent that, as illustrated in FIGURE 3, the thrust component 11 can be doubled for the same amplitude of applied vibratory force and the same diameters of balls 13 and sockets 14, by providing sockets 18, formed for example in a molded body 19 fixed to the upper or active plate 12. Conversely, one half the amplitude of the applied vibratory force used in the form shown in FIGURES 1 and 2 will produce the same thrust component 11 when the configuration shown in FIGURE 3 is used.

Figure 4:
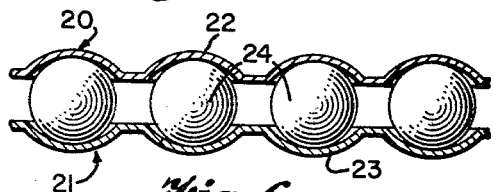

Similar operation and simple construction may be effected by the form shown in FIGURE 4 where the upper or active plate 20 and base plate 21 both formed of sheet metal, are each dimpled or stamped to provide spherical segment sockets 22, 23 having inwardly facing surfaces shaped similar to the inwardly facing surface of the sockets 13, 18 in the conveyor shown in FIGURE 3 to coact with the spherical balls 24 in a similar manner. It may be desirable to fill the void space between the balls 24 and plates 20, 21 with a resilient foamed material such as polyester urethane which is suitably bonded to the upper and lower plates 20, 21 to prevent vertical separation of the plates 20, 21 and to prevent the balls 24 from leaving their sockets 22, 23.

Figure 5:
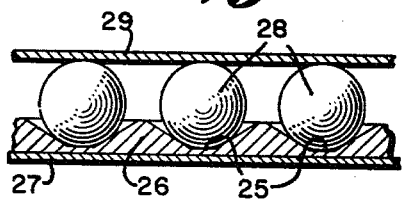

It will be apparent that thrust components similar to those produced with the form illustrated in FIGURES 1 and 2 may be effected by using conical shaped sockets 25 in the molded body of material 26 bonded to the rigid base plate 27, as illustrated in FIGURE 5, in which the spherical balls 28 ride to impart the desired vertical and horizontal thrust components to the active or top plate 29. Relative doubling of the thrust component can be achieved in the same manner obtained in the FIGURE 3 form by providing similar conical shaped sockets in a body of molded material bonded to the top plate 29.

Figure 6:
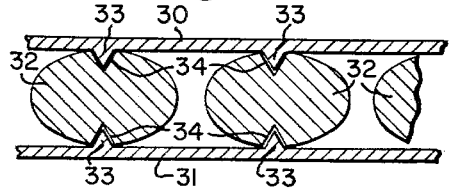
Figure 7:
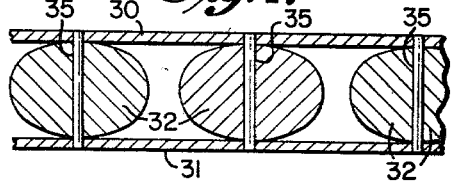

Another form of construction for producing the desired thrust component is illustrated in FIGURE 6, wherein the vibratory conveyor comprises an active or top plate 30, a base plate 31 and a plurality of oblate ellipsoidal bodies 32 disposed between the plates 30 and 31 which are rocked when the upper plate is vibrated generally along the axis of the desired path of movement 17 to impart an upward and forward thrust to the active plate 30. Pips or projections 33 on the upper and lower plates 30, 31 projecting into sockets 34 formed in the oblate ellipsoidal bodies 32, as illustrated in FIGURE 6, with sufficient looseness of fit to tolerate rocking movement of the bodies 32, or flexible ties 35 secured to the upper and lower plates 30, 31 and extending through suitable bores in the oblate ellipsoidal bodies 32, as shown in FIGURE 7, position the bodies 32 during the rocking movement.

While several different embodiments of the present invention have been particularly shown and described, it is apparent that various modifications may be made therein within the spirit and scope of the invention, and it is desired, therefore, that only such limitations be placed on the invention as are imposed by the prior art and set forth in the appended claims.

In the claims:
1. A vibratory conveyor comprising a stationary base member, a vibratory work member spaced above said base member movable with respect thereto having an upwardly facing work surface for supporting objects to be conveyed, said stationary base member and work member each having confronting active surface portions, a plurality of hard roller bodies disposed between said members having opposed working surface portions in engagement with said active surface portions of both of said members at vertically alined points of contact for supporting said work member above and in substantially horizontal parallel relation with said base member, said roller bodies each having a like configuration defined by a convex curve of revolution about the vertical axis through the points of contact thereof, said active surface portions of said work member imparting corresponding rotation to each of said roller bodies about mutually parallel horizontal axes responsive to vibration of said work member in substantially horizontal directions, said active surface portions of said members having shapes coacting with the shapes of the working surface portions of said roller bodies to cause said roller bodies to exert horizontal and vertical thrust force components on said work member upon rotation of said roller bodies responsive to vibration of said work member to propel objects placed on said work surface along said work surface, the working surface portions of said roller bodies and said active surface portions having such radial symmetry with respect to the vertical axes through their points of contact with each other that said work member may be vibrated in any horizontal direction to effect travel of objects placed on said work surface along the work surface in any horizontal direction.

2. A vibratory conveyor comprising a stationary base member, a vibratory work member spaced above said base member movable with respect thereto having an upwardly facing work surface for supporting objects to be conveyed, said stationary base member and work member each having confronting active surface portions, a plurality of hard balls disposed between said members of approximately spherical configuration having working surface portions in engagement with said active surface portions of both of said members for supporting said work member above and in substantially horizontal parallel relation with said base member, said active surface portions of said work member imparting corresponding rotation to each of said balls responsive to vibration of said work member in substantially horizontal directions, said active surface portions of said members having shapes coacting with the shapes of the working surface portions of said balls to cause said balls to exert horizontal and vertical thrust force components on said work member upon rotation of said balls responsive to vibration of said work member to propel objects placed on said work surface along said work surface, the working surface portions of said balls and said active surface portions having such radial symmetry with respect to the vertical axes through their points of contact with each other that said work member may be vibrated in any horizontal direction to effect travel of objects placed on said work surface along the work surface in any horizontal direction.

3. A vibratory conveyor comprising a stationary base member, a vibratory work member spaced above said base member movable with respect thereto having an upwardly facing work surface for supporting objects to be conveyed, said stationary base member and work member each having confronting active surface portions, a plurality of hard spherical balls disposed between said members in engagement with said active surface portions of both of said members for supporting said work member above and in substantially horizontal parallel relation with said base member, said active surface portions of said work member imparting corresponding rotation to each of said balls responsive to vibration of said work member in substantially horizontal directions, said active surface portions of said members having shapes coacting with the shapes of the surfaces of said balls to cause said balls to exert horizontal and vertical thrust force components on said work member upon rotation of said balls responsive to vibration of said work member to propel objects placed on said work surface along said work surface, said active surface portions on at least one of said members including a plurality of sockets corresponding in number to said balls and disposed in nested relation with portions of said balls, and the surfaces of said balls and said sockets being radially symmetrical with respect to substantially vertical axes perpendicular to said members through their points of contact whereby said work member may be vibrated in any horizontal direction to effect travel of objects placed on said work surface along the work surface in any horizontal direction.

4. A vibratory conveyor comprising a stationary base plate, a vibratory work plate spaced above said base plate movable with respect thereto, said plates being disposed in parallel planes and having confronting inner surfaces, the inner surface of at least one of said plates having a plurality of spherical segment concave sockets, a plurality of hard spherical balls seated in said sockets and extending between said plates to support said work plate above and in substantially parallel relation with said base plate, said work plate being in engagement with said balls to impart corresponding rotation thereto responsive to vibration of said work plate in substantially horizontal directions, said sockets having spherical segment surfaces of a radius greater than the radius of said balls shaped to provide surface portions progressing from the associated plate toward the other of said plates to impart movement to said balls and said work plate upon rotation of said balls to shift said work plate in directions providing propelling forces directed upwardly and along the plane of said work plate for propelling objects disposed thereon, the surfaces of said balls and of said sockets being radially symmetrical with respect to substantially vertical axes through their points of contact to permit production of horizontal thrust components in any horizontal direction responsive to vibration of the work plate for effecting travel of said objects in any selected horizontal direction.

5. A vibratory conveyor comprising a stationary planar base plate, a vibratory planar work plate spaced above said base plate movable with respect thereto, said plates being disposed in parallel planes and having confronting inner planar surfaces, a plurality of hard oblate ellipsoid balls extending between and engaging said plates to support said work plate above and in parallel relation with said base plate, said work plate being in engagement with said balls to impart corresponding rotation thereto responsive to vibration of said work plate in any substantially horizontal direction whereby rotation of said balls causes said work plate to move in directions providing propelling forces directed upwardly and along the plane of said work plate in a horizontal direction corresponding to the axis of vibration for propelling objects disposed thereon along selected paths.

6. A vibratory conveyor as defined in claim 5, wherein said balls have bores extending therethrough along the minimum dimension of the balls and flexible ties extend through said bores and are connected to said work plate and base plate to restrain the balls against displacement along the plates while accommodating rotary movement thereof.

7. A vibratory conveyor as defined in claim 5, wherein said work plate and base plate have rigid short projections extending inwardly from said confronting inner planar surfaces at the zones of contact of said balls with said inner surfaces, and said balls have diametrically opposite sockets at said zones of contact receiving said projections in loosely fitting relation therein for restraining the balls against displacement along the plates while accommodating rotary movement thereof.

References Cited by the Examiner

FOREIGN PATENTS 395,819    5/24    Germany.

SAMUEL F. COLEMAN, *Primary Examiner.*

EDWARD A. SROKA, *Examiner.*